G. W. DUDLEY.
Saw Filing and Setting-Machine.
No. 226,291.  Patented April 6, 1880.
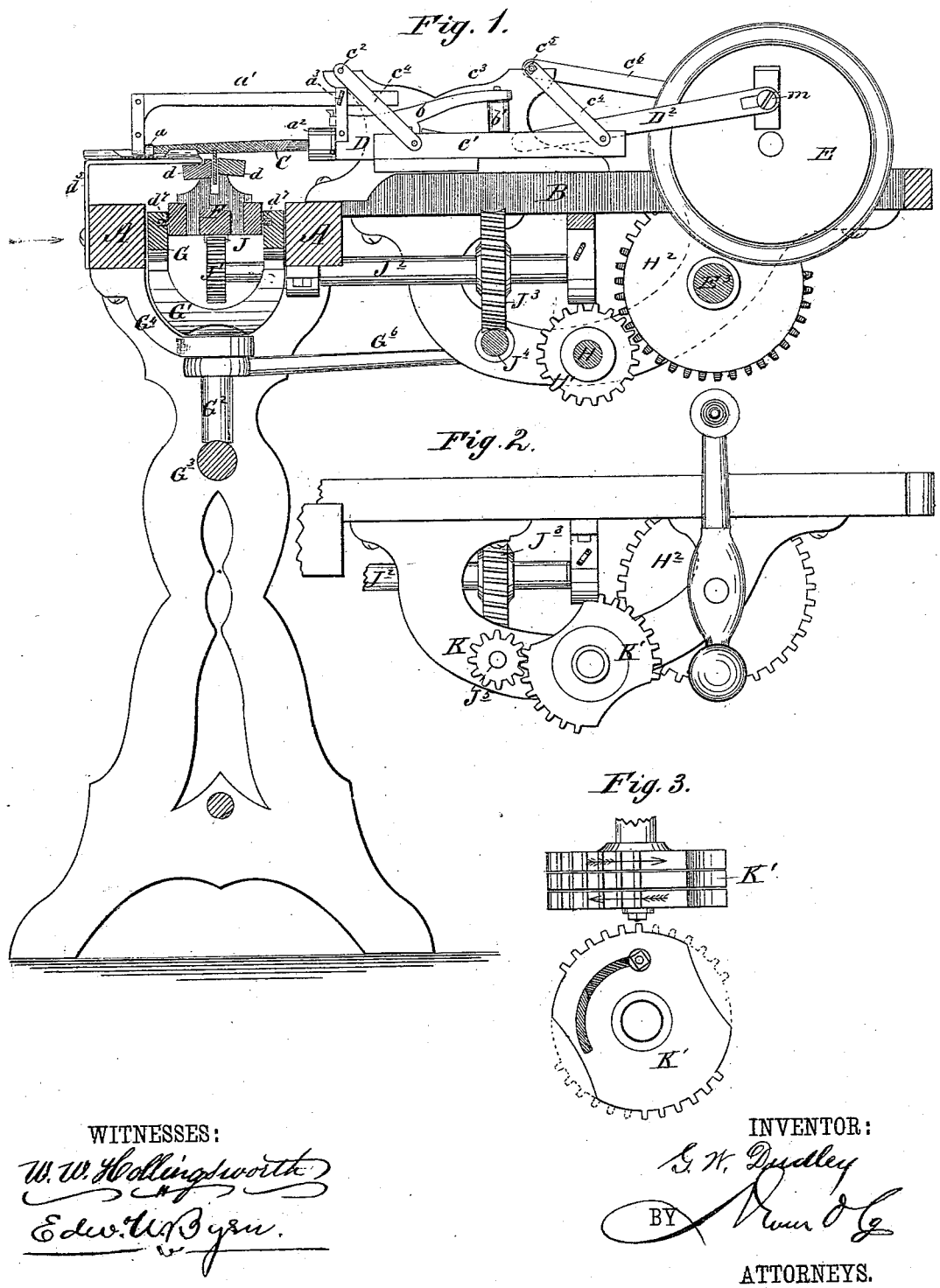
WITNESSES:
W. W. Hollingsworth
Edw. W. Byrn
INVENTOR:
G. W. Dudley
BY
ATTORNEYS.

3 Sheets—Sheet 2.
G. W. DUDLEY.
Saw Filing and Setting-Machine.
No. 226,291.  Patented April 6, 1880.
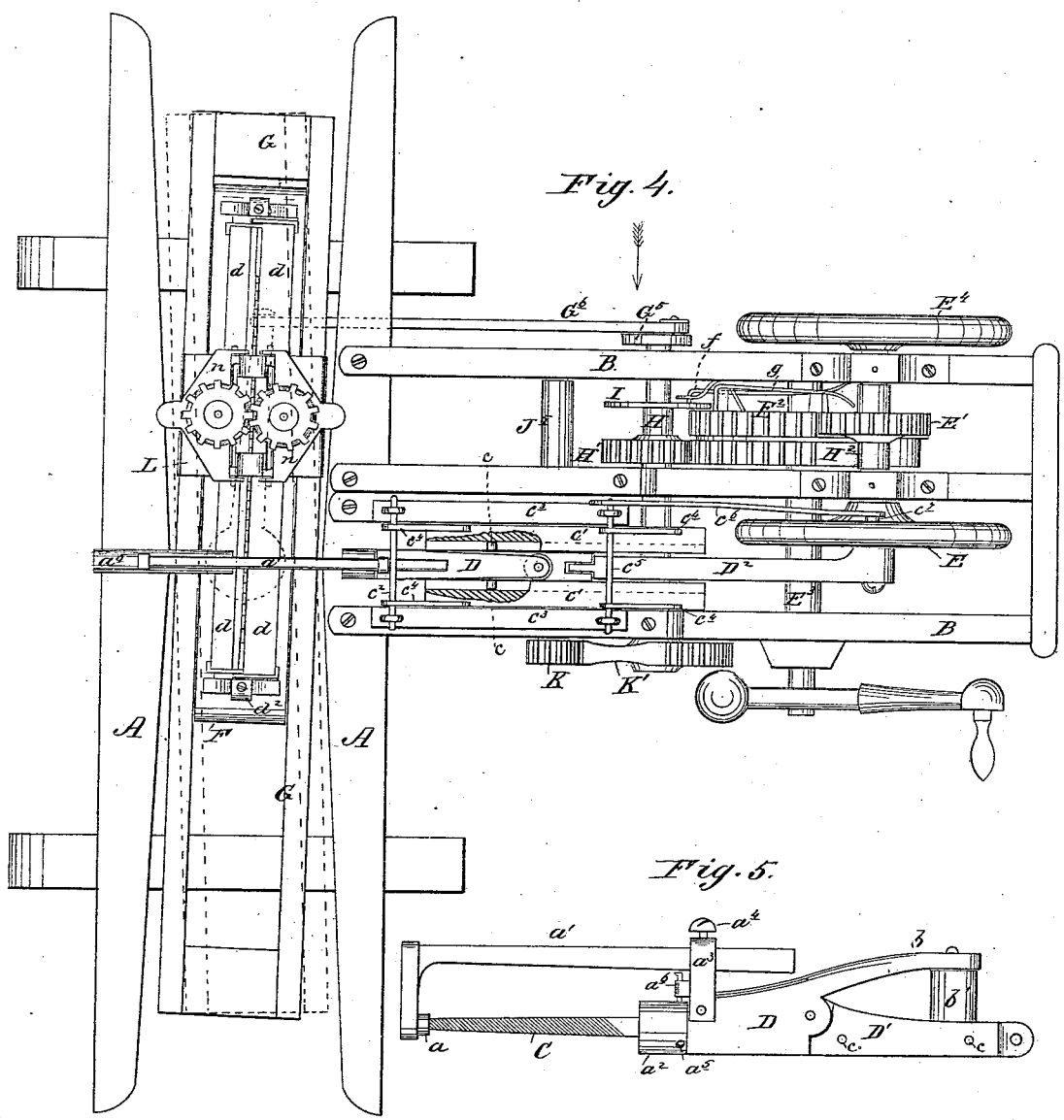
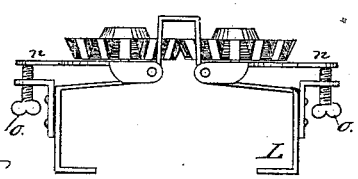
WITNESSES:
W. W. Hollingsworth
Edw. W. Byrn
INVENTOR:
G. W. Dudley
BY
ATTORNEYS.

G. W. DUDLEY.
Saw Filing and Setting-Machine.
No. 226,291. Patented April 6, 1880.
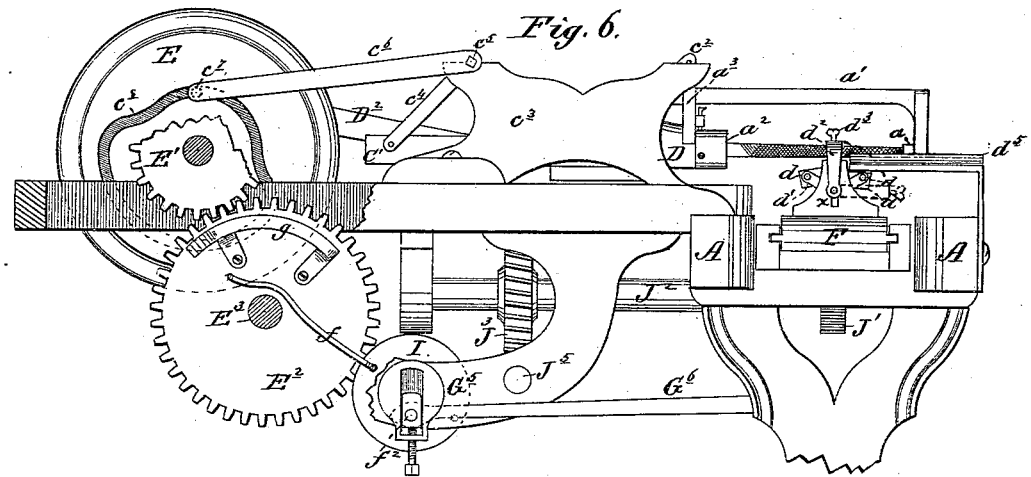
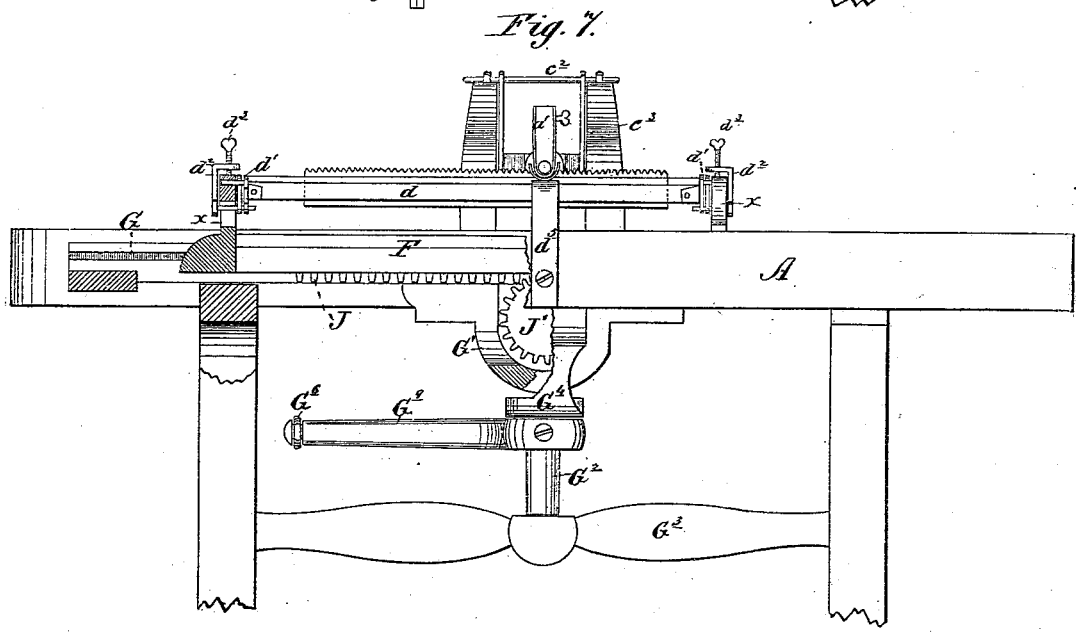
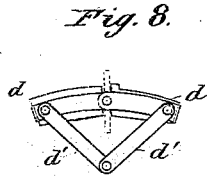
WITNESSES:
W. W. Hollingsworth
Edw. W. Byrn
INVENTOR:
G. W. Dudley
BY
ATTORNEYS.

UNITED STATES PATENT OFFICE.

GEORGE W. DUDLEY, OF WAYNESBOROUGH, VIRGINIA, ASSIGNOR OF ONE-HALF OF HIS RIGHT TO RUSSELL F. WAY.

SAW FILING AND SETTING MACHINE.

SPECIFICATION forming part of Letters Patent No. 226,291, dated April 6, 1880.

Application filed August 12, 1879.

*To all whom it may concern:*

Be it known that I, GEORGE W. DUDLEY, of Waynesborough, in the county of Augusta and State of Virginia, have invented a new and Improved Saw Filing and Setting Machine; and I do hereby declare that the following is a full, clear, and exact description of the same, reference being had to the accompanying drawings, forming part of this specification, in which—

Figure 1 is a vertical section taken crosswise the saw-blade. Fig. 2 is a side view of that portion of the machine immediately above the figure. Fig. 3 are details of the adjustable feed-wheel. Fig. 4 is a plan view of the entire machine. Fig. 5 is a side view of the file-holding bar. Fig. 6 is a side view of the upper portion of the machine, looking in the direction of the arrow in Fig. 4. Fig. 7 is a front view of the machine, looking in the direction of the arrow in Fig. 1. Fig. 8 is a detail of the toggle-links at the ends of the saw-clamping jaws. Fig. 9 is a side view of the saw-setting device.

My invention consists of a novel construction of saw filing and setting machine designed especially for saws having a straight row of teeth, and it comprises features of improvement as follows: first, the peculiar construction and arrangement of devices for imparting an elastic cutting-stroke to the file; second, means for raising the file on the back stroke; third, a peculiar construction of guide for holding outer end of file-frame against lateral displacement and determining the depth of cut; fourth, means for shifting angular position of saw to give alternate incline to the edge of teeth; fifth, clamping and holding devices for the saw; sixth, means for adjusting the saw to an angular or straight position; seventh, means for locking and holding the saw in position; eighth, the peculiar construction and arrangement of the saw-set; ninth, means for adapting the feed-wheel to the different sizes of teeth of different saws; tenth, the double adjustment of the wrist-pin connecting with the file-driving pitman to adapt the device to longer or shorter files, all as hereinafter fully described.

In the drawings, A A represent two parallel bars, between which are arranged the saw-carrying devices. These bars are mounted upon the top of a suitable frame-work, and have attached to them a frame, B, projecting horizontally at right angles, which carries the file-driving devices. This frame B will in practice be supported by an additional leg or brace, which may be made to connect with or form a part of the main supporting-frame.

C is the file, which is of the ordinary three-corner shape, and is held at its outer end in a rotary thimble, $a$, Figs. 1, 5, and 6, in the pendent right-angular end of the file-bow, $a'$, and at its other end is similarly held in the revolving head $a^2$, arranged upon the outer end of the file-bar D.

Rising from the end of the file-bar is a strap or socket, $a^3$, in which is slid the inner end of the file-bow $a'$, which latter is adjustably retained by a set-screw, $a^4$, so that any length of file can be accommodated.

To allow any one of the edges of the file to be brought into action the head $a^2$ is made to revolve, and is provided with bolt-holes $a^5$, Fig. 5, into which a bolt, $a^6$, is forced to hold the file against turning on its axis.

By means of these devices the ordinary three-corner file may be adapted to and used with the machine.

To render the pressure of the file on the saw elastic or to cause it to have the yielding pressure of the wrist the file-bar D is jointed to the section D', and has an upper and rearwardly extended arm, $b$, between which and the section D' a rubber spring, $b'$, is interposed, which has always a tendency to force the file down against the saw and yet causes it to ride over the teeth with a yielding movement.

With respect to this feature I do not claim, broadly, a jointed and spring-pressed file-bar, as this general construction is old. I do not know, however, that the peculiar construction shown has ever been heretofore employed, and I claim the same as my invention.

For driving the file-bar with a reciprocating motion the section D' is connected with the pitman $D^2$, whose other end is connected by a wrist-pin to the wheel E, which wheel is keyed upon the same shaft with balance-wheel $E^4$ and pinion E'. This pinion receives motion from the gear-wheel $E^2$ on the lower shaft, $E^3$, which shaft may be rotated by a hand-crank, as shown, or by power.

For raising the file on its back stroke the section $D'$ of the file-bar is provided with guide-pieces $c$, which slide in a groove in the parallel swinging guide-bars $c'$ $c'$. These bars at one end are loosely connected by links $c^4$ to a cross-shaft, $c^2$, arranged upon the frame $c^3$, and the other end of the said swinging guides are loosely connected to the lower ends of arms $c^4$, rigidly connected to the shaft $c^5$, which latter is also journaled in the frame $c^3$. Now, on the advance movement of the pitman the swinging guides are at their lowest point to allow the file to rest on the saw; but on the backward movement the said swinging guide-bars are swung upwardly to allow the file to pass over the teeth of the saw without cutting. To accomplish this movement the shaft $c^5$ is provided with a rigid arm, $c^6$, which extends to the pitman-driving wheel E, and has a right-angular friction-roller, $c^7$, at its end, which enters a cam-groove, $c^8$, in the side of said wheel. Now, as one portion of the cam-groove is farther from the center of the wheel than the other portion, the travel of the roller therein causes the arm $c^6$ to rock the shaft $c^5$, which, acting through the rigid arms sustaining this end of the swinging guide-bars, gives the lift to the file-bar when retreating.

For holding the saw while being operated upon, two elongated jaws, $d$ $d$, are provided, which, at their ends, are pivoted, at a point centrally between the same, to upward projections $x$, rising from the carriage F. To the outer edges of the jaws are also pivoted links $d'$ $d'$, Fig. 8, which are also, at their lower ends, pivoted to each other, so that by throwing this lower joint of these links upward the said links act as toggles to cause the two jaws to clamp the saw between. To effect this movement an angular piece, $d^2$, is made to connect with the toggle-joint through a slot in the projection from the carriage, and is bent over the projection, and provided with a set-screw, $d^3$, as shown in Fig. 7.

For opening the jaws the piece $d^2$ may be thrown off the projection, as shown in dotted lines in Fig. 6, so as to unlock the toggle-joint; or the same result may be obtained by releasing the set-screws $d^3$, which would allow the piece $d^2$ and toggle-joint to descend together. The set-screws at each end are designed mainly, however, to adapt the jaws to different thicknesses of saws.

For defining the depth of the cut of the file a right-angular piece, $d^5$, Fig. 1, is secured to the outer bar, A, and is made to rest upon one of the jaws. This piece $d^5$ fulfills several functions: First, when the file has cut as deep into the saw as it should go the outer end of the file-frame strikes the piece $d^5$ and stops further cutting action; secondly, by being made grooved upon its upper surface it receives and guides the outer end of the file-frame against lateral displacement, insuring uniform teeth; thirdly, by abutting against the jaws it acts as a brace to resist the strain upon the saw-carriage caused by the advance movement of the file.

I am aware that a grooved file-guide is not new; but I do not know that a file-guide has been mounted upon the rigid frame-work and made to abut against the file-jaws, so as to brace the jaws laterally against the advance filing strain; and I claim this feature.

In filing the saw every alternate tooth should be filed at a reverse angle, and for this purpose the position of the saw-holding device is changed at every tooth. To accomplish this result the inner sides of the bars A A are inclined each way from the middle, (see Fig. 4,) so as to leave the space between the same diverging each way from the center. Between these bars I place a guide-frame, G, arranged to oscillate about a central vertical axis. This guide-frame is of rectangular shape, and has upon the inside of its longitudinal bars grooves which receive the lugs $d^7$, Fig. 1, of the saw-carriage F, so that while the saw-carriage travels intermittingly in the frame G to effect the feed the said frame is at every tooth swung horizontally into an angular position to the file, which is the reverse of that which it maintained for the preceding tooth. In securing these several movements the oscillating frame G is mounted upon a support, $G'$, which terminates below in a vertical rock-shaft, $G^2$, stepped or pivoted on the cross-bar $G^3$ of the main supporting-frame, and held in position by a bearing in the bracket $G^4$, attached to bar A. From this rock-shaft $G^2$ there projects at right angles the rock-arm $G^9$, whose outer extremity is connected with the disk $G^5$ by a pitman, $G^6$. This disk is fixed upon a shaft, H, and receives an intermittent motion by pinion $H'$ and the segmental gear $H^2$ on the main crank-shaft.

It will thus be seen that through the instrumentality of the pitman and rock-arm the frame G has an intermittent horizontally-oscillating movement, which causes the file to cut each tooth at an angle reverse to that immediately preceding it.

After the saw has been thrown into a position to be cut it is necessary that it should be firmly held in such position. For this purpose a disk, I, is fixed upon the shaft H, and is perforated to receive the spring-actuated locking-stud $f$, Figs. 4 and 6, which, when the frame G is at its limit of movement, rests in one of the holes of the disk to lock the parts against further movement. When the position of the parts is to be shifted again an offsetting projection, $g$, on the wheel $E^2$ strikes the locking-bolt and withdraws it from the perforated disk, after which the segmental gear effects the movement of the oscillating frame.

In some cases it is not necessary to give a reversely-inclined cut to the alternate saw-teeth, but the filing is required to be done always at a right angle. To adapt my invention to this use the saw-adjusting pitman $G^6$ is connected to the disk $G^5$ by a wrist-pin, $f^2$, Fig. 6, which is adjusted in a slot in said disk. This slot leads through the center of the disk, so that the wrist-pin may be adjusted to a position directly on the center of the said disk. When in such position it is obvious that no motion is communicated to the pitman and the shifting devices are held stationary with the saw-clamping jaws at right angles to the file.

I do not claim the adjustment of the wrist-pin across the face of the disk of itself, but only the combination of the same with the co-acting parts in a saw-filing machine for accomplishing the result described.

For feeding the saw-clamping jaws along as the teeth are successively filed a toothed rack-bar, J, Fig. 7, is connected to the bottom of the saw-carriage, and a pinion, J', is made to engage therewith, which pinion is fixed upon a shaft, $J^2$, journaled in bearings beneath the frame, which shaft is provided with a worm-wheel, $J^3$. This worm-wheel is engaged by a worm, $J^4$, on the shaft $J^5$, at right angles to the shaft $J^2$, and an intermittent motion is given to effect the feed, as follows: A pinion, K, is fixed upon the end of the worm-shaft $J^5$, and with this engages a segmental gear-wheel, K', fixed upon the same end of the shaft operating the saw-shifting devices, so that when said shaft is turned the diametrical sets of teeth on the segmental wheel alternately rotate the worm-gear, and, through the instrumentality of the rack and pinion, advance the saw with a step-by-step movement. To lock the saw at each step of its movement, so as to prevent it from advancing from the action of the file, the toothed segments of the wheel K' are made sufficiently long with respect to the segment of the wheel $H^2$ to cause the segment of wheel K' to linger in mesh with the pinion at the end of each feed-step, and as the shaft bearing the segmental wheel K' is locked by the locking devices for the saw-shifter it is obvious that the saw also is locked at the end of each advance movement.

For saws of different sizes of teeth a corresponding different range of movement must be given to the feed, and for this purpose I construct the segmental wheel K' in sections, placed side by side, as in Fig. 3, which sections have an independent movement on their common axis, and which are securely held to any adjustment that may be given them by means of a set-screw. The toothed segments of each of these sections are exactly of the same number and size of teeth, and when all of their teeth are parallel or in registration the length of the compound segment is at its shortest, and this adjustment is adapted to the finest-toothed saw. When, however, a saw of larger tooth is to be filed, the sections of the segmental wheel are turned one upon the other, so that the length of the segment of the wheel is increased. This, it will be seen, gives an increased throw to the feeding devices and allows any desired adjustment to be obtained.

To permit the saw-carriage to be run back after it has been fed forward as far as it can go, I may use either a spring-clutch for connecting the worm-wheel to its shaft, or I may locate the end of said shaft in a movable bearing, so that the worm-wheel may be lifted out of gear with the worm.

In adapting my machine to different lengths of stroke, different lengths of file are used, and, to enable the machine to receive the same, a double adjustment of the pitman to the drive-wheel is required. First, in order to give an increased range of stroke the wrist-pin $m$, Fig. 1, which retains the pitman, is made adjustable in a slot in the drive-wheel to or from the center, and as an increased crank throw is thus provided at one end of the pitman and a longer file at the other, it is obvious that the pitman must be shortened in order to cause the file to move from heel to point over the saw without running over the same. I therefore make the wrist-pin not only adjustable in the slot of the drive-wheel, but adjustable also in a slot of the pitman, to increase or diminish its length according to circumstances.

For setting the teeth of the saw in the same operation of filing I provide a frame, L, Figs. 4 and 9, which embraces the saw-clamping jaws and is screwed to the oscillating frame below. Upon the frame on each side of the path of the saw are hinged horizontal seats $n\ n$, which are raised or lowered by set-screws $o\ o$ at their outer edges. Upon these hinged seats are pivoted the horizontally-swiveling setting-wheels, whose peripheries are notched to correspond to the desired set, and the notches in which mesh together, so that when the saw passes between them by the movement of the carriage a set is given to the teeth alternately in opposite directions. These setting-wheels are detachable and a series of the same are provided corresponding to different sizes of teeth, any of which may be used as circumstances may require.

By tightening the screws $o$ the hinged seats are raised, and the wheels carrying the same are thrown tighter against the saw-teeth to give more or less set or to adapt the device to different thicknesses of saw-blade.

Having thus described my invention, what I claim as new is—

1. The file-bar consisting of the section D', the section D, jointed thereto and having an arm, $b$, and a spring, $b'$, interposed between said arm and the section D', substantially as and for the purpose described.

2. The file-driving bar arranged to play in swinging guides and combined with the same, and mechanism, substantially as described, for raising the guides and the file on the back stroke, as set forth.

3. The combination of the file-driving bar, the swinging guides $c'$, links $c^9$, shaft $c^2$, the rock-shaft $c^5$, having rigid arms $c^4$ and $c^6$, and the drive-wheel E, having a cam-groove, substantially as and for the purpose described.

4. The saw-holding devices consisting of the elongated jaws $d\ d$, pivoted centrally to the carriage, the links $d'\ d'$, pivoted to the outer edges of the jaws and also to each other, and the angular or hook-shaped fastening-piece $d^2$, connected to the toggle-joint of the links and provided with a set-screw adapted to bind against a projection from the carriage, substantially as and for the purpose described.

5. The combined stop, guide, and brace, consisting of the grooved piece $d^5$, fixed to the frame A, and combined with the same, and the traveling carriage, as shown and described.

6. The bars A A, cut away with a double incline from the center, in combination with the horizontally-oscillating guide-frame containing the saw-carriage and the transversely-reciprocating file, as and for the purpose described.

7. The combination of the horizontally-swinging frame G, the support G′, terminating in a rock-shaft, $G^2$, and having rock-arm $G^9$, the pitman $G^6$, connected with disk $G^5$, the shaft H, having pinion H′, and the segmental wheel $H^2$ on the drive-shaft.

8. In combination with the oscillating frame G and the intermittent driving device, the pitman $G^6$, and the disk $G^5$, connected by an adjustable wrist-pin having a range of movement from the center of the disk outwardly to adapt the saw to be oscillated for the reverse cut, or be held at right angles to the file for a straight cut, as described.

9. The combination, with the devices for driving the oscillating frame, of the perforated disk I, the spring locking-bolt $f$, and the wheel $E^2$, having an offset, $g$, for releasing the said bolt, as shown and described.

10. The devices for feeding the saw-carriage, consisting of a rack, J, pinion J′, shaft $J^2$, worm-wheel $J^3$, worm $J^4$, pinion $J^5$, and segmental wheel K′, fixed upon the shaft H, the pinion H′, and the segmental wheel $H^2$, all combined, as shown and described.

11. The combination, with the main drive-wheel E and the file-driving pitman, of the wrist-pin $m$, made adjustable both in the side of the wheel and in the length of the pitman, to adapt the machine to different lengths of file.

12. The saw-set consisting of a frame having pivoted seats $n\ n$, carrying notched wheels and provided with set-screws $a$, as and for the purpose described.

13. The combination, with the oscillating saw-frame G and the traveling saw-carriage, of the saw-set frame L, fixed to the said frame G and straddling the carriage, and having hinged horizontal seats $n$, carrying setting-wheels and provided with set-screws, as and for the purpose described.

The above specification of my invention signed by me this 24th day of July, 1879.

G. W. DUDLEY.

Witnesses:
   EDWD. W. BYRN,
   W. R. TALLEY.